United States Patent
Etchenique

(10) Patent No.: US 7,292,423 B2
(45) Date of Patent: Nov. 6, 2007

(54) ACOUSTIC/UNDERWATER SIGNALING DEVICE

(75) Inventor: Andres Etchenique, 444 Brickell Ave. 51-262, Miami, FL (US) 33131

(73) Assignee: Andres Etchenique, Miami, FL (US)

( * ) Notice: Subject to any disclaimer, the term of this patent is extended or adjusted under 35 U.S.C. 154(b) by 144 days.

(21) Appl. No.: 11/144,914

(22) Filed: Jun. 6, 2005

(65) Prior Publication Data

US 2006/0034155 A1 Feb. 16, 2006

Related U.S. Application Data

(60) Provisional application No. 60/600,043, filed on Aug. 10, 2004.

(51) Int. Cl.
B63C 11/26 (2006.01)
G10K 1/07 (2006.01)

(52) U.S. Cl. ................. 361/134; 367/141; 367/910

(58) Field of Classification Search ............ 367/141, 367/142, 148, 910, 134; 116/26
See application file for complete search history.

(56) References Cited

U.S. PATENT DOCUMENTS

| | | | |
|---|---|---|---|
| 4,095,667 A * | 6/1978 | Mahig et al. | 367/910 |
| 4,514,834 A * | 4/1985 | Hanson et al. | 367/141 |
| 4,852,510 A * | 8/1989 | Joseph et al. | 367/910 |
| 4,950,107 A * | 8/1990 | Hancock et al. | 116/112 |
| 4,998,499 A * | 3/1991 | Nordbeck | 116/142 FP |
| 5,022,790 A * | 6/1991 | Stevenson | 116/142 FP |
| 5,129,351 A * | 7/1992 | Feder | 116/307 |
| 5,302,055 A * | 4/1994 | Johnston | 116/112 |
| 5,652,734 A * | 7/1997 | Fish | 367/142 |
| 5,951,205 A * | 9/1999 | Chen | 116/27 |
| 6,160,760 A * | 12/2000 | Rayner | 367/910 |
| 6,578,511 B1 * | 6/2003 | Dexter et al. | 116/137 R |
| 2006/0034155 A1 * | 2/2006 | Etchenique | 367/134 |

* cited by examiner

*Primary Examiner*—Daniel Pihulic

(57) ABSTRACT

The present invention is concerned with an underwater communication device, that is simple in design, in operation, powered solely from the hand against the resistance of a spring or elastic band, is low maintenance, is resistant to accidental sound generation, offers a wide margin of safety, reliability, and enables audible communication. The present invention is concerned with a device containing a housing (3) an acoustic signature generating means (1) to produce an audible sound when struck. A strike element (2) powered by a kinetic energy generating means (4) causing it to impact the acoustic element (1). A gripping attachment (5) attached to strike (2) pulled away from the acoustic signature generating means (1) increasing tension in the kinetic energy generating means (4). Upon gripping attachment (5) release, increased tension of kinetic energy generating means (4) powers strike element (2) to impact acoustic signature generating element (1), creating distinguishable sound.

6 Claims, 4 Drawing Sheets

SPRING DESIGN DIAGRAM

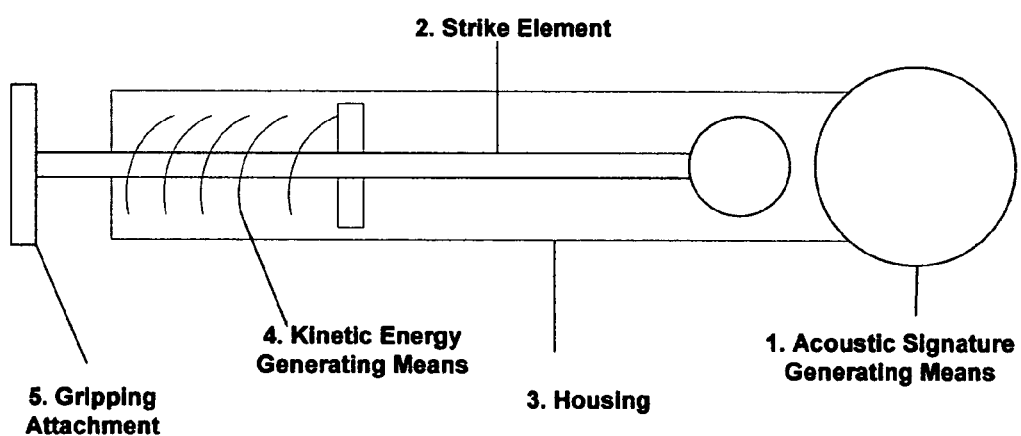
FIGURE 1 SPRING DESIGN DIAGRAM

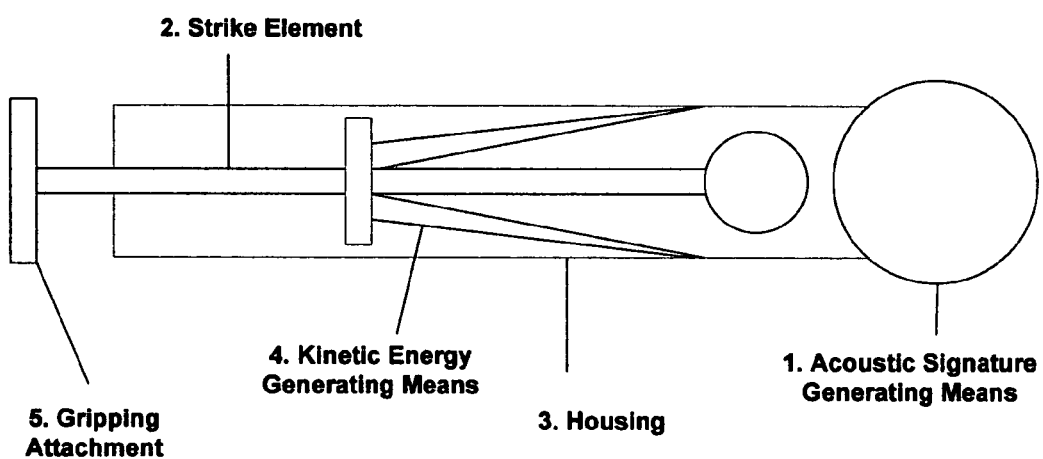
FIGURE 2 BAND DESIGN DIAGRAM

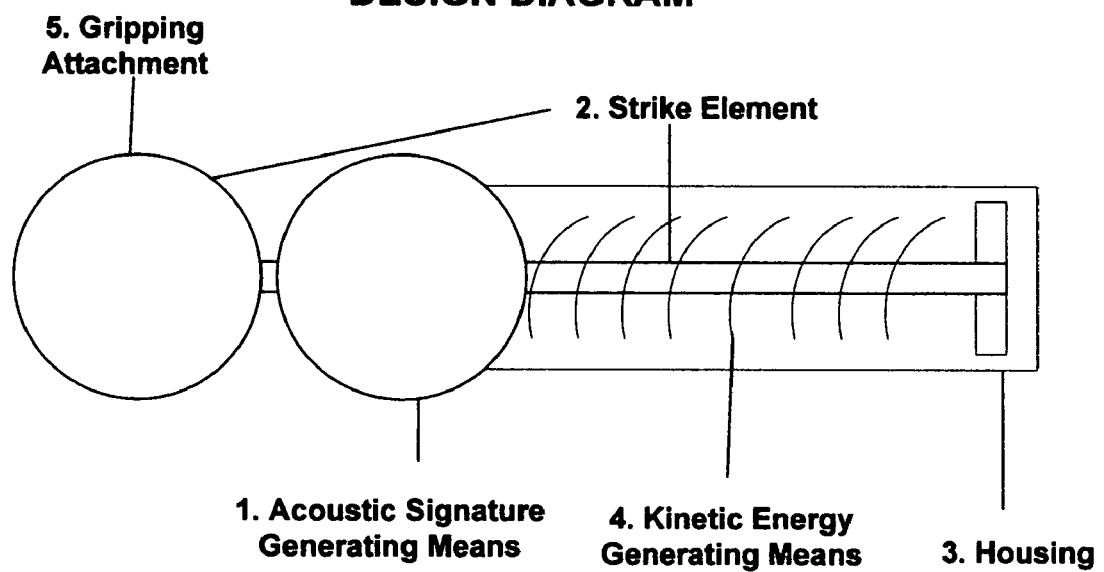

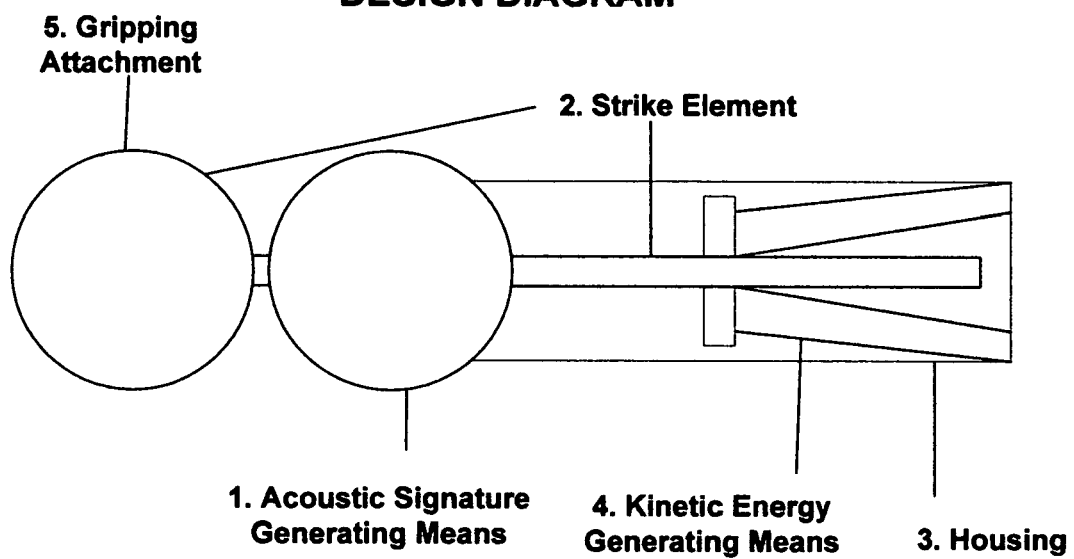
FIGURE 4 GRIP - STRIKE ELEMENT BAND DESIGN DIAGRAM

ACOUSTIC/UNDERWATER SIGNALING DEVICE

CROSS REFERENCES TO RELATED APPLICATIONS

This application claims the benefit of Provisional Patent Application Ser. No. 60/600,043, filed Aug. 10, 2004 by the present inventor.

FEDERALLY SPONSORED RESEARCH

Not Applicable

SEQUENCE LISTING OR PROGRAM

Not Applicable

BACKGROUND OF THE INVENTION

1. Field of the Invention

The invention relates to a signaling device and emergency alert system for environments where verbal communication is impaired or impossible such as underwater.

2. Prior Art

In the underwater environment, swimmers and divers often find it complicated, if not impossible, to verbally communicate. Air tanks used by divers and snorkels used by swimmers are some of the many items used when swimmers or divers are above, at, or below the surface of the water. These devices along with the water itself create a barrier to the swimmer or diver's making audible sounds.

The limited communication ability between swimmers and divers can at times be life-threatening. Therefore, there exists a great need for a simple, workable, handheld, self-powered underwater signaling device that can be heard over other sounds including, but not limited to, the noise made from a diver's regulator or snorkel. The signaling device should produce an audible sound having a characteristic that is unique and distinguishable from other underwater sounds, and in other words, be indicium. The present invention solves a problem that swimmers and divers have had for decades, allowing them to easily signal each other underwater or under speech limiting conditions.

Over the years, numerous types of existing art with respect to underwater communication devices have been developed. However, conventional underwater communication devices have many deficiencies which discourage most swimmers and divers from using them, and therefore, have not gained wide acceptance and use.

A major problem of many conventional communication devices for use underwater is that they have multiple moving components, which generally increases their risk of failure. Swimmers and divers—know that their hobby or profession is high-risk, and therefore, demand maximum reliability from all of their equipment. To increase reliability, an underwater communication device should be simple in design and should employ a minimum number of components that might fail.

Another downfall of most conventional underwater communication devices is that they require significant maintenance to maintain an acceptable level reliability and performance, such as in U.S. Pat. No. 4,095,667 to Mahig (1978). To reduce maintenance effort and expense while maximizing reliability, a swimmer or diver would surely prefer an underwater communication device that requires only simple maintenance.

Yet another drawback of some conventional underwater communication devices is that they require a diver to enter an unusual or uncomfortable body position such as reaching one arm behind one's back toward the area of the dive tank, as in U.S. Pat. No. 5,129,351 to Feder (1992); or reaching an arm down to one's calf to obtain a dive knife to bang against one's air tank. An underwater signaling device should be non-obtrusive and should be accessible wherever a swimmer or diver needs it quickly and naturally—preferably near a diver's buoyancy compensator or vest or near a swimmer or diver's torso area.

Still another drawback of many conventional underwater communication devices is that they are so difficult to operate that not all swimmers or divers can easily become proficient in their use. An underwater communication device that would be easy to use and understood by any swimmer or diver would be preferable.

Still yet another discouraging feature of some conventional underwater communication devices is that in order to work they must either replace, or be attached to, a standard scuba gear component, such as the buoyancy compensator or a second-stage air regulator. An underwater communication device that would not require interfering or changing the function of any other piece of scuba gear would be preferable.

Still yet another significant problem of many conventional underwater communication devices is that they require an energy source to function. For example, there are underwater communication devices that require a battery to function. However, batteries are not always reliable and a low or dead battery can cause the device to fail. Replacing or recharging batteries is expensive and not convenient. Air pressure is also used as a power source for underwater communication devices. The air pressure could be generated by a scuba tank or from an air compressor; however, it would reduce air available for breathing or would require a secondary remote air source that would be an inconvenience. A swimmer or diver would prefer an underwater communication device that operates off of a simple hand-held activity powered by the user, not electricity, air pressure, or any other artificial energy source.

U.S. Pat. No. 6,160,760 to Rayner (2000) shows a "pistol grip" type device with a complex set of moving parts that are akin to a trigger mechanism, powered by a spring that strikes at a "bell" when the trigger is depressed by the user. The device has two springs in a sealed chamber, however, sealed chambers may pose a problem at depth due to pressure and possible buoyancy issues. While the device holds merits in the very likelihood that it could possibly accomplish its designated task, many complications seem to be obvious in its design, and possible functionality. Furthermore it is not clear, and many tests indicate, that the dampening effect of water would not permit a distinctively loud and attention grabbing acoustic signature to be produced by such a device. It is also important to add that the complexity of the moving parts and the design, defeat a measure of reliability and resilience that swimmers and divers look for, since the effects of water and salt water and the rough handling the swim and dive equipment typically receives will put any device under a considerable amount of stress. Furthermore the hydrodynamic profile of moving a bell-shaped device through water may cause it to create movement and vibration similar to that of a fishing lure, causing discomfort and distraction for the swimmer or diver.

U.S. Pat. No. 5,652,734 to Fish (1997) shows an alternate method, in which a sealed tubular device encloses ball bearings or any other matter that when shaken, will emit sound much like a musical device many percussionists use when performing. While simple in design, the device is surprisingly heavy, may display buoyancy issues, and due to obvious "sealed" air space, could result in a collapse of structure or water flooding at depth. The device must be "stored" in a pocket of the vest, or hung from the equipment leaving it free to rattle around randomly. Furthermore the device must be shaken vigorously when used, which is obtrusive to swimmers and divers, and if not cared for continuously, may as previously stated, emit noise randomly. Many swimmers and divers also state that the device does not produce enough of a sound to be effective underwater and have discontinued its use.

U.S. Pat. No. 5,129,351 to Feder (1992) shows a simple rubber loop that has a ball attached to it. This device is slipped over a dive tank while setting up dive equipment, and is used by reaching behind one's back toward the tank and pulling the ball away from the tank then releasing it, causing the ball to strike the tank and produce a desirable acoustic signature. This alternate method, while very simple, presents a new set of challenges to divers in that the device is typically uncomfortable to use, since the diver must unnaturally reach his or her arm back behind their body, which is difficult when wearing full equipment. The device must be re-seated on each new tank as the diver changes out empty air tanks for full ones. Divers need to "feel around" without the benefit of having eyesight behind ones' back to find the ball to activate the device, which can be challenging in an emergency situation. Some divers also use expensive, painted tanks and are vehemently opposed to striking them purposely with any object. Furthermore, the acoustic signature tends to resonate very closely to the diver's ear since the top of dive tanks are closely positioned to a diver's head. Straps and stays that hold the tank in place also may dampen the sound produced by the device.

Other "pneumatic" driven devices that are typically attached to the $2^{nd}$ stage hose of a diver's air supply equipment have been proposed and some exist, as in U.S. Pat. No. 4,095,667 to Mahig (1978), U.S. Pat. No. 4,852,510 to Joseph (1989), U.S. Pat. No. 4,950,107 to Hancock (1990), U.S. Pat. No. 4,998,499 to Nordbeck (1991), U.S. Pat. No. 5,022,790 to Stevenson (1991), U.S. Pat. No. 5,302,055 to Johnston (1994), U.S. Pat. No. 5,951,205 to Chen (1999), and U.S. Pat No. 6,578,511 to-Dexter (2003). While most are effective, these devices exhibit considerable drawbacks if the diver unexpectedly encounters a prospective lack of air pressure coming from the dive tank. These devices also are comprised of many metal moving parts that will undoubtedly require maintenance, will suffer exposure and likely corrosion, may have a likelihood of failure after extensive operation, and have been known to reduce the value of many swimmers and divers' recreational experiences by being excessively loud, thereby disturbing the tranquil atmosphere enjoyed and sought after by most swimmers and divers. Many swim and dive leaders have outlawed the use of air-powered devices, alleging that they may be obtrusive and obnoxious.

In conclusion, insofar as I am aware, no hand powered device has been produced that is very convenient and easy to use by beginners, novices and experts alike, has very few moving parts, is very resistant to the stresses of a swimmers or diver's environment and handling, produces an alerting yet unobtrusive acoustic signal only on command, is streamlined and convenient in design, all at once. To summarize, the existing underwater communication devices experience one or more of these disadvantages:

(a) are designed using multiple components that can fail;

(b) require substantial maintenance to obtain an acceptable level of reliability and performance;

(c) require too much thinking or practice to use properly and consistently;

(d) involve the adaptation of a swimmer or diver's gear in order to perform;

(e) require an artificial energy source to perform.

(f) are susceptible to the effects of pressure found underwater, and may fail as a result thereof,

OBJECTS AND ADVANTAGES

The present invention prevails over the stated disadvantages of earlier devices and offers significant advantages. Moreover, several objectives and advantages of my invention are:

(a) to provide an underwater communication device that can function using a minimal number of moving parts;

(b) to provide an underwater communication device that is free from easily breakable parts such as seals, spurs, triggers or valves;

(c) to provide an underwater communication device that is low maintenance;

(d) to provide an underwater communication device that can be used with or without gloves;

(e) to provide an underwater communication device that can be easily used by any swimmer or diver with single or minimum action;

(f) to provide an underwater communication device that can operate without the adaptation or modification of any other piece of a swimmer or divers' gear;

(g) to provide an underwater communication device that may provide underwater communication up to 75 feet;

(h) to provide an underwater communication device that can operate without using electricity, air pressure, or another artificial energy source;

(i) to provide an underwater communication device that is a complete, self-powered and self-contained underwater communication system.

(j) to provide an underwater communication device that is not subject to the effects of pressure found at depth.

SUMMARY

In accordance with the present invention a handheld underwater signaling device comprises an acoustic signature generating element that signals divers underwater when impacted by a strike element which is propelled by the use of a kinetic energy generating means.

DRAWINGS—FIGURES

FIG. 1 shows a lateral cross section view of the "BEST-MODE" configuration of the device powered by a kinetic energy generating means that is a spring.

FIG. 2 shows a lateral cross section view of an alternate configuration of the device with a kinetic energy generating means that is an elastic material.

FIG. 3 shows a lateral cross section view of another alternate configuration of the device using a kinetic energy generating means that is a spring, and where the gripping attachment and acoustic signature generating means are located on the same side of the housing.

FIG. 4 shows a lateral cross section view of another alternate configuration of the device using a kinetic energy generating means that is an elastic material, and where the gripping attachment and acoustic signature generating means are located on the same side of the housing.

DRAWINGS—REFERENCE NUMERALS

1. Acoustic Signature Generating Means
2. Strike Element
3. Housing
4. Kinetic Energy Generating Means
5. Gripping Attachment

DETAILED DESCRIPTION—FIGS. 1, 2, 3 AND 4—PREFERRED EMBODIMENT

The attached drawings represent lateral cross sections of the device with "cutaway" type drawings to illustrate the device's internal workings. An underwater signaling device provides a housing 3 having an acoustic signature generating means 1. A gripping attachment 5 is provided and fastened to a strike element 2. The strike element 2 is sized for travel within the housing 3. A kinetic energy generating means 4 may partially or completely travel within the housing 2. By pulling the gripping attachment 5 away from the housing 3, the strike element 2 moves away from the acoustic signature generating means 1 and the tension is created in the kinetic energy generating means 4. When the gripping attachment 5 is released, the said tension will cause the strike element 2 to move toward, and impact the acoustic signature generating means 1. The acoustic signature generating means 1 may be attached to either end of the housing 3.

Advantages

From the description above, a number of advantages of my underwater signaling device become evident:

(a) to provide an underwater communication device that can function using a minimal number of moving parts;

(b) to provide an underwater communication device that is free from easily breakable parts such as seals, spurs, triggers or valves;

(c) to provide an underwater communication device that is low maintenance;

(d) to provide an underwater communication device that can be used with or without gloves;

(e) to provide an underwater communication device that can be easily used by any swimmer or diver with a single or minimum action;

(f) to provide an underwater communication device that can operate without the adaptation or modification of any other piece of a swimmer or divers' gear;

(g) to provide an underwater communication device that may provide underwater communication up to 75 feet;

(h) to provide an underwater communication device that can operate without using electricity, air pressure, or another artificial energy source;

(i) to provide an underwater communication device that is a complete, self-powered and self-contained underwater communication system.

(j) to provide an underwater communication device that can operate at any depth, Conclusions, Ramifications & Scope Accordingly, the reader will see that the signaling device of this invention can be easily used by anyone, without complication, by a simple single-action motion to an easily reachable area on their body. The invention meets all of the proposed characteristics of an innovative and value-adding tool for aquatic recreation such as diving. Furthermore, the invention adds a very important component of safety to the overall experience that it permits divers in distress to easily and rapidly call attention of their diving buddies it assist divers in orienting themselves in low visibility conditions it permits divers to rapidly produce indicium acoustic signature thereby rapidly alerting other divers it promotes safety by easily delivering a communication option to divers Although the description above contains much specificity, they should not be construed as limiting the scope of the invention but as merely providing illustrations of some of the presently preferred embodiments of this invention. For example, the acoustic signature generating means can have other shapes such as circular, oval, trapezoidal, triangular, flat, etc.; the strike element can have other shapes; the gripping attachment can have other shapes, etc.

Thus the scope of the invention should be determined by the appended claims and their legal equivalents, rather than by the examples given.

I claim:

1. A underwater signaling device whereby divers may quickly, easily and comfortably produce indicium acoustic signature thereby attracting attention of other divers comprising:

(a) a housing of predetermined dimension;

(b) an acoustic signature generating means to produce audible signature on impact located at one extremity of said housing;

(c) a strike element sized for travel within said housing;

(d) a kinetic energy generating means selected from the group of consisting of springs and elastic materials carried within said housing and attached to said strike element and said housing.

2. The signaling device of claim 1 where said housing encloses said strike element.

3. The underwater signaling device of claim 1, which may be constructed of different materials and colors, including, but not limited to, fluorescent, non corrosive, impact resistant, durable material, allowing it to be long lasting, durable and found easily in the darkness.

4. The signaling device of claim 1 where said strike element may be pulled in opposite direction of said acoustic signature generating means whereby tension is created in the kinetic energy generating means.

5. The signaling device of claim 1 where said strike element may impact said acoustic signature generating means upon release, thereby generating significant indicium acoustic signature.

6. A method of signaling underwater comprising:

(a) providing a housing of predetermined length comprising an internal strike element partly protruding from one extremity of said housing, a gripping attachment connected to protruding end of said strike element, a kinetic energy generating element selected from the group consisting of springs and elastic materials respectively connected to said housing and said strike element, and an acoustic signature generating means that is attached to said housing at opposite end of protruding strike element, b) providing a means to attach said housing to diver's equipment at the diver's desired, easy to reach position, c) reaching easily in a single motion to pull said gripping attachment connected to said strike element thereby creating tension in said kinetic energy generating element, d) releasing said gripping attachment thereby causing said strike element to impact said acoustic signature generating means thereby creating a distinctive and audible, indicium acoustic signature.

* * * * *